United States Patent
Luo et al.

(10) Patent No.: US 12,167,283 B2
(45) Date of Patent: Dec. 10, 2024

(54) INFORMATION TRANSMISSION METHOD AND DEVICE, STORAGE MEDIUM, AND ELECTRONIC DEVICE

(71) Applicant: ZTE Corporation, Shenzhen (CN)

(72) Inventors: Wei Luo, Shenzhen (CN); Lin Chen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 390 days.

(21) Appl. No.: 17/254,530

(22) PCT Filed: May 27, 2019

(86) PCT No.: PCT/CN2019/088657
§ 371 (c)(1),
(2) Date: Dec. 21, 2020

(87) PCT Pub. No.: WO2019/242460
PCT Pub. Date: Dec. 26, 2019

(65) Prior Publication Data
US 2021/0274394 A1    Sep. 2, 2021

(30) Foreign Application Priority Data

Jun. 21, 2018  (CN) .......................... 201810645966.9

(51) Int. Cl.
*H04W 36/00*    (2009.01)
*H04W 36/08*    (2009.01)
*H04W 76/19*    (2018.01)

(52) U.S. Cl.
CPC ... *H04W 36/0033* (2013.01); *H04W 36/0016* (2013.01); *H04W 36/0064* (2023.05); *H04W 36/08* (2013.01); *H04W 76/19* (2018.02)

(58) Field of Classification Search
CPC ..... H04W 40/22; H04W 92/20; H04W 76/10; H04W 88/085; H04W 76/12;
(Continued)

(56) References Cited

U.S. PATENT DOCUMENTS

2007/0136564 A1    6/2007  Menon
2013/0182555 A1*   7/2013  Raaf ...................... H04W 76/19
                                                              370/216
(Continued)

FOREIGN PATENT DOCUMENTS

CN    101400088 A    4/2009
CN    102104906 A    6/2011
(Continued)

OTHER PUBLICATIONS

International Search Report for corresponding application CT/CN2019/088657 filed May 27, 2019; Mail date Jul. 29, 2019.
(Continued)

*Primary Examiner* — Nam T Huynh
(74) *Attorney, Agent, or Firm* — CANTOR COLBURN LLP (57) ABSTRACT

Provided are an information transmission method and device, a storage medium and an electronic device, the method including receiving, by a third transmission node, context information of a first transmission node or a second transmission node transmitted by the first transmission node; and storing, by the third transmission node, the context information.

13 Claims, 6 Drawing Sheets

(58) Field of Classification Search
CPC ... H04W 84/04; H04W 84/047; H04W 16/32;
H04W 36/0033; H04W 36/0077; H04W
92/045; H04W 36/08; H04W 76/19;
H04W 36/305; H04W 36/30; H04W
36/0085; H04W 36/0016
See application file for complete search history.

(56) References Cited

U.S. PATENT DOCUMENTS

| | | | | |
|---|---|---|---|---|
| 2013/0183971 | A1* | 7/2013 | Tamaki | H04W 36/165 |
| | | | | 455/436 |
| 2014/0135007 | A1* | 5/2014 | Yu | H04W 24/02 |
| | | | | 455/436 |
| 2017/0311189 | A1 | 10/2017 | Almalfouh et al. | |
| 2021/0022040 | A1* | 1/2021 | Zhu | H04W 80/02 |
| 2021/0176670 | A1* | 6/2021 | Keskitalo | H04W 36/0011 |
| 2021/0259051 | A1* | 8/2021 | Latheef | H04W 24/02 |
| 2021/0345197 | A1* | 11/2021 | Akl | H04W 36/0033 |

FOREIGN PATENT DOCUMENTS

| | | |
|---|---|---|
| CN | 102291821 A | 12/2011 |
| CN | 102404807 A | 4/2012 |
| CN | 102685785 A | 9/2012 |
| CN | 102685817 A | 9/2012 |
| CN | 102752818 A | 10/2012 |
| EP | 2387270 A1 | 11/2011 |
| EP | 2833669 A1 | 2/2015 |
| WO | 2009046672 A1 | 4/2009 |
| WO | 2014182213 A1 | 11/2014 |
| WO | 2016130062 A1 | 8/2016 |
| WO | 2018057076 A1 | 3/2018 |

OTHER PUBLICATIONS

CATT, "Discussion on suppor of delta configuration during handover procedure", 3GPP TSG-RAN WG3#99, Athens Greece, 26 Feb. 2-18, R3-180801.

European Search Report for corresponding application EP19821651; Report dated Dec. 10, 2021.

Huawei, "UE context management on F1", 3GPP TSG-RAN3 Meeting #96, Hangzhou, China May 15-19, 2017, R3-171852.

Samsung, "Introduction of UE based mobility", 3GPP TSG-RAN WG2 20217 Jan NR Ad-Hoc Meetingt Spokane, USA, Jan. 17-19, 2017.

Samsung, Introduction of UE based mobility, 3GPP TSG RAN WG2 Jan. 2017 NR Ad-hoc Meeting Spokane, USA Jan. 17-19, 2017, R2-1700400.

European Search Report for corresponding application EP24155995; Report dated Oct. 9, 2024.

* cited by examiner

INFORMATION TRANSMISSION METHOD AND DEVICE, STORAGE MEDIUM, AND ELECTRONIC DEVICE

TECHNICAL FIELD

The present disclosure relates to the field of communications, and in particular, to an information transmission method and device, a storage medium, and an electronic device.

BACKGROUND

In order to improve network capacity and coverage while satisfying the requirements for cell deployment flexibility, a relay link supporting wireless backhaul transmission is proposed in the related art to achieve the deployment of a dense network. A node supporting a relay function is referred to as a Relay Node (RN). The RN provides, for User Equipment (UE) accessing the cell of the RN, functions and services similar to those provided by a normal base station (also referred to as evolved Node B, eNB for short). A wireless interface between the RN and the UE is referred to as an access link. The RN accesses an eNB serving the RN via the wireless interface in a manner similar to the manner in which a normal UE access the eNB. The eNB serving the RN is referred to as a donor base station (also referred to as donor eNB, DeNB for short). The wireless interface between the RN and the DeNB is referred to as a "backhaul link".

Figure 1:
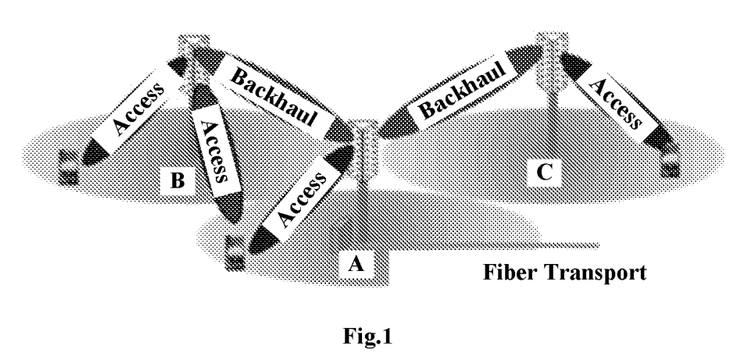
FIG. 1 is a schematic diagram of links related to IAB in the related art of the present disclosure.

Future communication technologies support a larger bandwidth and a larger scale multi-antenna or multi-beam transmission, which facilitates the implementation of a relay that shares air interface resources between the backhaul link and the access link, such implementation being referred to as Integrated Access Backhaul (IAB). In order to further improve the deployment flexibility, an ordinary IAB (also referred to as IAB node) does not need to be directly connected to a core network, and only a donor IAB (also referred to as IAB donor) is directly connected to the core network. Therefore, all ordinary IABs need to transmit data to the donor IAB to achieve the communication with the core network. Referring to FIG. 1, which is a schematic diagram of links related to IAB in the related art of the present disclosure, the IAB node A is connected to a core network via an optical fiber and serves as an IAB donor, while the IAB node B and the IAB node C are not connected to the core network and serve as ordinary IABs.

Figure 2:
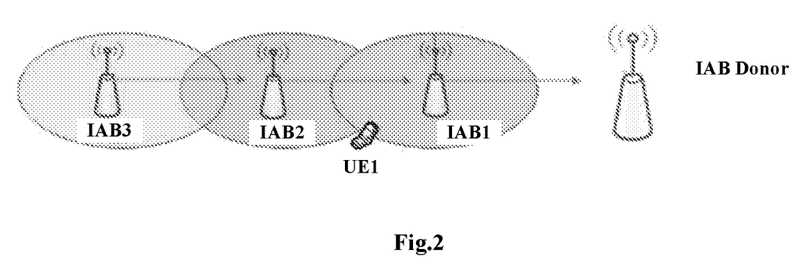
FIG. 2 is a schematic diagram of links when an IAB node serves as a relay in the related art of the present disclosure.

In order to further improve the flexibility of deployment, referring to FIG. 2, which is a schematic diagram of links when an IAB node serves as a relay in the related art of the present disclosure, an IAB may transmit data to an IAB donor through the relay of a plurality of IABs. In other words, the IABs are hierarchical, and the level of an IAB represents the Substitute Specification, Clean Version number of hops of relay IABs which the data from the IAB pass before reaching the IAB donor. Assuming that the level of the donor IAB is 0 and the level of the IAB accessed by the UE is N, then the transmission path between the UE and the core network sequentially passes through the IABs of the levels of 1,2 . . . . N. Assuming that the procedure of connection establishment between IABs is similar to the procedure of connection establishment between the UE and the eNB, the IAB of the level n+1 is the UE from the perspective of the IAB of the level n, and the IAB of the level n is the serving cell from the perspective of the IAB of the level n+1. If an IAB of the level n+1 is connected to an IAB of the level n via a Uu interface as a UE, then the IAB of the level n is referred to as a parent node of the IAB of the level n+1, and the IAB of the level n+1 is referred to as a child node of the IAB of the level n. Each IAB may choose to access one or more parent nodes. When the connection between the IAB of the level n and the parent node of the IAB of the level n is interrupted due to causes such as congestion or poor link quality, the solution in the existing mechanism is to re-establish the connection through a re-establishment procedure, but the introduced interruption delay is very long, and the requirement of the service on the delay may not be satisfied.

When the link communication between the relay node and the serving node of the relay node is interrupted due to causes such as poor link state or congestion, the solution in the existing mechanism is to re-establish the connection through a re-establishment procedure, but the introduced interruption delay is very long, and the requirement of the service on the delay may not be satisfied.

Aiming at the above problems existing in the related art, no effective solution has been proposed at present.

SUMMARY

Embodiments of the present disclosure provide an information transmission method and device, a storage medium, and an electronic device.

According to an embodiment of the present disclosure, an information transmission method is provided, including the following operations: a third transmission node receives context information of a first transmission node or a second transmission node transmitted by the first transmission node; and the third transmission node stores the context information.

According to an embodiment of the present disclosure, another information transmission method is provided, including the following operations: a target serving node of a transmission node receives handover preparation request information transmitted by a source serving node of the transmission node, wherein the handover preparation request information includes at least one of the followings: cause information, validity period information, cycle information, and identifier information of a target transmission node. The target serving node transmits handover preparation confirmation information to the source serving node after receiving the handover preparation request information, wherein the cause information is used for indicating that the handover preparation request information is a request for advance preparation for handover or a request for preparation for re-establishment: the validity period information is used for indicating a validity period of the handover preparation request information: the cycle information is used for indicating a cycle of transmitting the handover preparation request information, and when a handover or re-establishment operation is still not executed after expiration of the cycle, the handover preparation request information becomes invalid.

According to an embodiment of the present disclosure, yet another information transmission method is provided, including the following operations: a transmission node receives mobility control information transmitted by a target serving node of the transmission node, wherein the mobility control information is used for instructing the transmission node to execute handover: the transmission node executes the handover after receiving the mobility control information, wherein the transmission node is a terminal or an IAB.

According to an embodiment of the present disclosure, yet another information transmission method is provided, including the following operations: a transmission node receives a Radio Resource Control (RRC) connection release message or an RRC connection rejection message transmitted by a source serving node of the transmission node, wherein the RRC connection release message or the RRC connection rejection message includes an IAB list, the IAB list includes identifier information of one or more IAB nodes, identifier information of one or more donor IABs connected to the one or more IAB nodes, and Public Land Mobile Network (PLMN) information; and when a link connection failure occurs in the transmission node, an IAB node in the IAB list is preferentially selected for re-establishment.

According to another embodiment of the present disclosure, provided is an information transmission device, including: a receiving module, configured to receive context information of a first transmission node or a second transmission node transmitted by the first transmission node; and a storing module, configured to store the context information.

According to another embodiment of the present disclosure, provided is another information transmission device, applied to a target serving node of a transmission node. The information transmission device includes: a receiving module, configured to receive handover preparation request information transmitted by a source serving node of the transmission node, wherein the handover preparation request information includes at least one of the followings: cause information, validity period information, cycle information, and identifier information of a target transmission node; and a transmitting module, configured to transmit handover preparation confirmation information to the source serving node after receiving the handover preparation request information, wherein the cause information is used for indicating that the handover preparation request information is a request for advance preparation for handover or a request for preparation for re-establishment: the validity period information is used for indicating a validity period of the handover preparation request information: the cycle information is used for indicating a cycle of transmitting the handover preparation request information, and when a handover or re-establishment operation is still not executed after expiration of the cycle, the handover preparation request information becomes invalid.

According to another embodiment of the present disclosure, yet another information transmission device is provided, which is applied to a target handover serving node of a transmission node. The information transmission device includes: a transmitting module, configured to transmit mobility control information of the transmission node, wherein the mobility control information is used for instructing the transmission node to execute handover, and the target handover serving node of the transmission node is a source secondary serving node of the transmission node: wherein the transmission node is a terminal or an IAB.

According to another embodiment of the present disclosure, provided is another information transmission device, applied to a transmission node. The information transmission device includes: a receiving module, configured to receive an RRC connection release message or an RRC connection rejection message transmitted by the source serving node of the transmission node, wherein the RRC connection release message or the RRC connection rejection message includes an IAB list, the IAB list includes identifier information of one or more IAB nodes, identifier information of one or more donor IABs connected to the one or more IAB nodes, and PLMN information; and a processing module, configured to, when a link connection failure occurs, preferentially select an IAB node in the IAB list for re-establishment.

According to another embodiment of the present disclosure, a storage medium is also provided. The storage medium stores a computer program, wherein the computer program is configured to execute the operations in any one of the method embodiments at runtime.

According to another embodiment of the present disclosure, also provided is an electronic device, including a memory and a processor, wherein the memory stores a computer program, and the processor is configured to run the computer program to execute the operations in any one of the method embodiments.

According to the solution in the embodiments of the present disclosure, by means of receiving and storing context information of a first transmission node or a second transmission node, when there is a link interruption of the transmission node, link recovery can be executed based on the context information, thereby avoiding a re-establishment flow, solving the technical problem in the related art that the recovery delay of the link interruption is too long, and satisfying the requirements of services on the interruption delay.

BRIEF DESCRIPTION OF THE DRAWINGS

The accompanying drawings described herein are used to provide a deeper understanding of the present disclosure, and constitute a part of the present application. The exemplary embodiments of the present disclosure and the description thereof are used to explain the present disclosure. The drawings and the exemplary embodiment do not constitute limitations to the present disclosure. In the drawings.

DETAILED DESCRIPTION OF THE EMULSIONS

The present disclosure is described below with reference to the drawings and in conjunction with the embodiments in detail. It is to be noted that embodiments in the present application and characteristics in the embodiments may be combined to derive other embodiments not explicitly It is to be noted that the specification and claims of the present disclosure and the terms "first", "second" and the like in the drawings are used to distinguish similar objects, and are not used to describe a specific sequence or a precedence order.

EMBODIMENT 1

Figure 3:
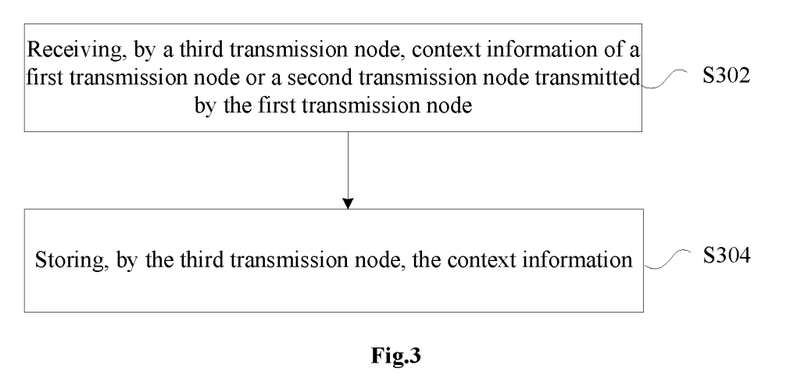
FIG. 3 is a flowchart of an information transmission method according to an embodiment of the present disclosure.

The embodiment provides an information transmission method. FIG. 3 is a flowchart of an information transmission method according to an embodiment of the present disclosure. As shown in FIG. 3, the method includes the following operations.

In operation S302, a third transmission node receives context information of a first transmission node or a second transmission node transmitted by the first transmission node. In operation S304, the third transmission node stores the context information.

According to the described operations, by means of receiving and storing context information of a first transmission node or a second transmission node, when there is a link interruption of the transmission node, link recovery can be executed based on the context information, thereby avoiding a re-establishment flow; solving the technical problem in the related art that the recovery delay of the link interruption is too long, and satisfying the requirements of services on the interruption delay:

In one or more implementations of the embodiment, in a CU/DU split scenario, the first transmission node is a centralized unit (CU), the second transmission node is a distributed unit (DU), and when the third transmission node includes one or more DUs, the first transmission node transmits the context information via an F1 interface.

In one or more implementations of the embodiment, before the third transmission node receives the context information of the first transmission node or the second transmission node transmitted by the first transmission node, the method further includes an operation that the third transmission node transmits, via the F1 interface, a request message for requesting to obtain the context information.

In one or more implementations of the embodiment, the operation that the third transmission node transmits, via the F1 interface, the request message for obtaining the context information includes that: the third transmission node transmits the request message via the F1 interface upon reception of an RRC re-establishment request.

In one or more implementations of the embodiment, the context information includes: a transmission node identifier and context information of the transmission node.

In one or more implementations of the embodiment, the context information further includes at least one of the followings: cause information, wherein the cause information is used for indicating a cause for transmitting the context information, and the cause includes at least one of the followings: handover preparation and re-establishment preparation: validity period information, wherein the validity period information is used for indicating a validity period of the context information: cycle information, wherein the cycle information is used for indicating a cycle of transmitting the context information, and when a handover or re-establishment operation is still not executed after expiration of the cycle, and the context information becomes invalid.

In one or more implementations of the embodiment, after the first transmission node transmits the context information, the first transmission node transmits indication information for releasing the context information of the first transmission node or the second transmission node.

When a link connection failure occurs in a fourth transmission node, a target transmission node which has the same donor node as a source serving node of the fourth transmission node is preferentially selected to execute an RRC re-establishment procedure, wherein the fourth transmission node is a terminal or an IAB.

In one or more implementations of the embodiment, in the non-CU/DU split scenario, when the first transmission node, the second transmission node and the third transmission node are relay nodes, the context information is transmitted via an Xn interface. In one or more implementations of the embodiment, the relay node includes at least one of the followings: a base station and an IAB.

In one or more implementations of the embodiment, when a link connection failure occurs in a fourth transmission node, a target transmission node having context information of the fourth transmission node is preferentially selected to execute an RRC re-establishment procedure, wherein the fourth transmission node is a terminal or an IAB.

Figure 4:
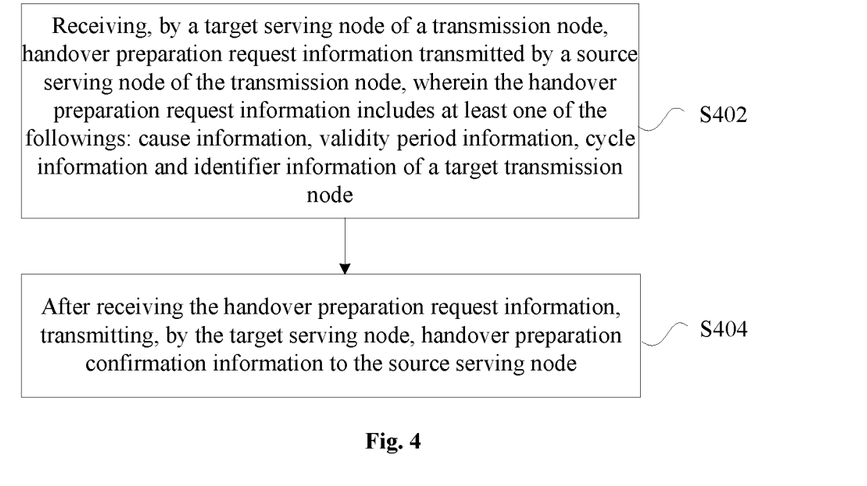
FIG. 4 is a flowchart of another information transmission method according to an embodiment of the present disclosure.

Another information transmission method is provided in this embodiment. FIG. 4 is a flowchart of another information transmission method according to an embodiment of the present disclosure. As shown in FIG. 4, the flow includes the following operations.

In operation S402, a target serving node of a transmission node receives handover preparation request information transmitted by a source serving node of the transmission node, wherein the handover preparation request information includes at least one of the followings: cause information, validity period information, cycle information and identifier information of a target transmission node.

In operation S404, after receiving the handover preparation request information, the target serving node transmits handover preparation confirmation information to the source serving node.

The cause information is used for indicating that the handover preparation request information is a request for advance preparation for handover or a request for preparation for re-establishment. The validity period information is used for indicating a validity period of the handover preparation request information. The cycle information is used for indicating a cycle of transmitting the handover preparation request information, and when a handover or re-establishment operation is still not executed after expiration of the cycle, the handover preparation request information becomes invalid.

In one or more implementations of the embodiment, the source serving node transmits the handover preparation request information to a plurality of target serving nodes, wherein the handover preparation request information is used for requesting preparation of handover resources, and identifier information of a plurality of target transmission nodes corresponds to the plurality of target serving nodes.

In one or more implementations of the embodiment, the source serving node is at least one of the followings: a CU, a DU, an IAB node, a relay, and a base station; and the target serving node is at least one of the followings: a DU, an IAB node, a relay and a base station.

In one or more implementations of the embodiment, when the transmission node is an IAB node, the source serving node is a parent node of the IAB node.

In one or more implementations of the embodiment, the target serving node transmits handover activation indication information to the source serving node after receiving the handover preparation request information.

In one or more implementations of the embodiment, after transmitting the handover activation indication information to the source serving node, the method further includes an operation of receiving handover activation confirmation information transmitted by the source serving node: or receiving serial number SN state information transmitted by the source serving node.

In one or more implementations of the embodiment, after the source serving node detects that a link connection failure occurs in the serving node, handover activation indication information is transmitted to the target serving node.

In one or more implementations of the embodiment, after transmitting the handover preparation request information to the target serving node, the source serving node transmits handover cancellation indication information to the target serving node, wherein the handover cancellation indication information includes a cause value for handover cancellation. After receiving the handover cancellation indication information, the target serving node releases context information and/or reserved resources of the transmission node corresponding to the handover cancellation indication information.

In one or more implementations of the embodiment, after transmitting the handover preparation request information to the target serving node, the source serving node transmits mobility control information to a transmission node, wherein the mobility control information includes handover activation condition information, and the handover activation condition information includes: time information for indicating a cycle of transmitting the mobility control information or indicating a validity period of the mobility control information, or, information for executing handover when a radio link failure occurs.

Figure 5:
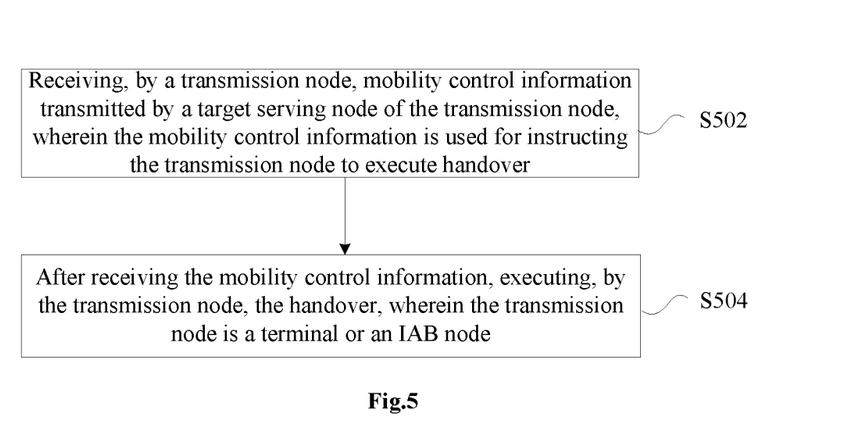
FIG. 5 is a flowchart of still another information transmission method according to an embodiment of the present disclosure.

Another information transmission method is provided in this embodiment. FIG. 5 is a flowchart of still another information transmission method according to an embodiment of the present disclosure. As shown in FIG. 5, the flow includes the following operations.

In operation S502, a transmission node receives mobility control information transmitted by a target serving node of the transmission node, wherein the mobility control information is used for instructing the transmission node to execute handover.

In operation S504, after receiving the mobility control information, the transmission node executes the handover.

The transmission node is a terminal or an IAB.

In one or more implementations of the embodiment, the target serving node is a source secondary serving node of the transmission node.

Still another information transmission method is provided in this embodiment. The information transmission method includes the following operations.

In operation S11, a transmission node receives an RRC connection release message or an RRC connection rejection message transmitted by a source serving node of the transmission node, wherein the RRC connection release message or the RRC connection rejection message includes an IAB list, the IAB list including: identifier information of one or more IAB nodes, identifier information of one or more donor IABs connected to the one or more IAB nodes, and PLMN information:

In operation S12, when a link connection failure occurs in the transmission node, an IAB node in the IAB list is preferentially selected for re-establishment. The transmission node may be an IAB or a terminal.

Through the description of the above implementations, those having ordinary skill in the art can understand that the method according to the above embodiment may be implemented by means of software plus a necessary general hardware platform, and of course, may also be implemented through hardware, but in many cases, the former is a better implementation. Based on such understanding, the essence of technical solution of the embodiments of the present disclosure, or in other words, the part of the technical solutions making contributions to the conventional art, may be embodied in the form of a software product stored in a storage medium (such as a Read-Only Memory (ROM)/Random Access Memory (RAM), a magnetic disk and an optical disc), including a number of instructions for enabling a terminal device (which may be a mobile phone, a computer, a server, or a network device, etc.) to perform the methods described in various embodiments of the present disclosure.

EMBODIMENT 2

The embodiment provides an information transmission device. The information transmission apparatus is used to implement the above embodiments and exemplary implementations, and the details having been described will not be repeated. As used below; the term "module" may implement a combination of software and/or hardware of a predetermined function. Although the apparatus described in the following embodiments is preferably implemented in software, the implementation in hardware or a combination of software and hardware is also possible and contemplated.

Figure 6:
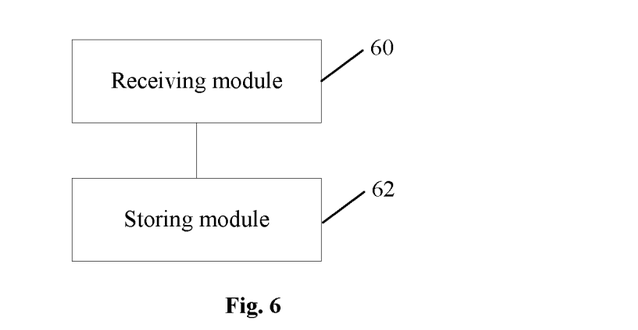
FIG. 6 is a structural block diagram of an information transmission device according to an embodiment of the present disclosure.

FIG. 6 is a structural block diagram of an information transmission device according to an embodiment of the present disclosure. As shown in FIG. 6, the device includes:
    a receiving module 60, configured to receive context information of a first transmission node or a second transmission node transmitted by the first transmission node; and a storing module 62, configured to store the context information.

Figure 7:
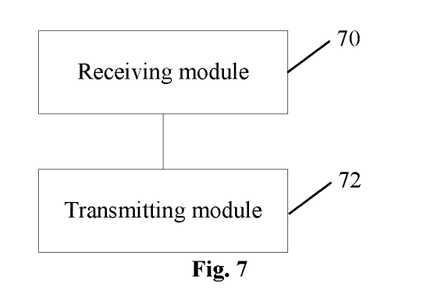
FIG. 7 is a structural block diagram of another information transmission device according to an embodiment of the present disclosure.

FIG. 7 is a structural block diagram of another information transmission device according to an embodiment of the present disclosure, applied in a target serving node of a transmission node. As shown in FIG. 7, the device includes:
    a receiving module 70, configured to receive handover preparation request information transmitted by a source serving node of the transmission node, wherein the handover preparation request information includes at least one of the followings: cause information, validity period information, cycle information and identifier information of a target transmission node; and
    a transmitting module 72, configured to transmit handover preparation confirmation information to the source serving node after receiving the handover preparation request information.

The cause information is used for indicating that the handover preparation request information is a request for advance preparation for handover or a request for preparation for re-establishment. The validity period information is used for indicating a validity period of the handover preparation request information. The cycle information is used for indicating a cycle of transmitting the handover preparation request information, and when a handover or re-establishment operation is still not executed after expiration of the cycle, the handover preparation request information becomes invalid.

In one or more implementations of the embodiment, the transmitting module is further configured to transmit handover activation indication information to the source serving node of the transmission node, and the receiving module is further configured to receive the handover activation indication information transmitted by the source serving node of the transmission node.

Figure 8:
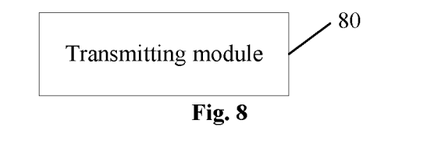
FIG. 8 is a structural block diagram of still another information transmission device according to an embodiment of the present disclosure.

FIG. 8 is a structural block diagram of still another information transmission device according to an embodiment of the present disclosure, applied in a target handover serving node of a transmission node. As shown in FIG. 8, the device includes:

a transmitting module 80, configured to transmit mobility control information of a transmission node, wherein the mobility control information is used for instructing the transmission node to execute handover. In the embodiment, the target handover serving node of the transmission node is a source secondary serving node of the transmission node; and the transmission node is a terminal or an IAB.

The present embodiment also provides an information transmission device, applied to a transmission node. The information transmission device includes: a receiving module, configured to receive an RRC connection release message or an RRC connection rejection message transmitted by a source serving node of the transmission node, wherein the RRC connection release message or the RRC connection rejection message includes an IAB list, the IAB list including: identifier information of one or more IAB nodes, identifier information of one or more donor IABs connected to the one or more IAB nodes, and PLMN information.

The information transmission device further includes a processing module configured to preferentially select an IAB node in an IAB list for re-establishment when a link connection failure occurs.

It is to be noted that each of the above modules may be implemented by software or hardware. For the latter, the modules may be implemented by, but not limited to, either of the following manners: the above modules are all located in the same processor: or, the above modules are located in different processors in any combination form respectively.

EMBODIMENT 3

The present embodiment includes the following implementations, which are used for describing the implementations of the solution of the present application in different scenarios in detail.

Implementation 1

Re-establishment optimization solution: in order to ensure re-establishment success, a terminal or an IAB node had better know in advance which cells possess the context information of the terminal or the IAB node. For a CU/DU split scenario, a donor CU may obtain context information of an IAB, therefore, it is proposed that all IAB DUs connected to the same donor CU obtain context information of other IAB DUs through the donor CU. If the selected IAB for re-establishment and the original parent IAB are connected to the same donor CU, the re-establishment is more likely to succeed. In this embodiment, the DU and the CU exchange context information via the F1AP.

When re-establishment occurs, IABs connected to the same donor CU are preferentially selected as the re-establishment target IABs.

In addition, for the non CU/DU split scenario, the IAB donor may also obtain and store context information of all the child IABs connected directly or indirectly to the IAB donor and notify other neighboring child IABs of the context information. In this way, when detecting an RLF, the IAB node may preferentially select other IABs under the same IAB donor as a re-establishment target IAB. In addition, different IAB nodes can directly exchange the context information of their respective child IABs via an Xn interface, the parent IAB node can notify the child IABs of which neighboring IABs have the context information of the child IABs in advance, and these neighboring IABs can be preferentially selected as the re-establishment target IAB. Alternatively, different IAB nodes directly exchange their respective context information via an Xn interface, so that the IABs know which IABs have their context information, and the IABs having their context information can be preferentially selected as the re-establishment target IAB.

Implementations 1-1, 1-2, 1-3, 1-4, 1-5 and 1-6 are provided.

Implementation 1-1 For the CU/DU split scenario, the following operations are included.

In operation 1, the CU transmits context information of one or more IABs to the DU via the F1 interface.

The context information includes a transmission node identifier (e.g., gNB-CU UE FIAP ID) and bearer establishment information. Further, the context information may also include cause information for indicating a cause for transmitting the context information of the transmission node, e.g., for executing RRC re-establishment. Further, the context information may also include validity period information for indicating a validity period of the context information, and when the handover or RRC re-establishment operation is still not executed after expiration of the validity period, the context information becomes invalid.

Further, the context information may include cycle information for indicating a cycle of transmitting the context information, and when the handover or re-establishment operation is still not executed after expiration of the cycle, the context information becomes invalid.

In operation 2, after receiving the context information of one or more DUs transmitted by the CU, the DU stores the context information. In one or more implementations of the embodiment, the DU may transmit confirmation information to the CU.

Implementation 1-2

For the CU/DU split scenario, the difference between the current implementation 1-2 and the implementation 1-1 lies in that, before the CU transmits context information of one or more DUs to the DU via the F1 interface, the following operation 1 may further be executed.

In operation 1, the DU transmits, via an F1 interface, a message for requesting to obtain context information of a certain transmission node.

Further, after the DU receives the RRC re-establishment request transmitted by the transmission node, the DU transmits, via the F1 interface, a message for requesting to obtain context information of the transmission node. The transmission node may be a terminal or an IAB.

The context information of the transmission node requested to be obtained includes: a transmission node identifier (used for indicating an identifier of the transmission node and being used for identification of different transmission nodes at an F1 interface) and bearer establishment information, and may further include cause information, wherein the cause information is used for indicating a cause for transmitting the context information of the transmission node, for example, the cause value may be set for indicating that the context information is used for executing re-establishment.

Implementation 1-3

For CU/DU split scenario, when the CU selects a candidate serving node for the CU, the CU transmits context information of the DU to the candidate serving node. However, after the CU determines to replace the candidate serving node for the DU according to the channel and service conditions, if the candidate serving node selected previously is no longer used as the candidate serving node, the CU may notify the candidate serving node to release the context information of the DU.

Implementation 1-4

For a non CU/DU split scenario, the following operations are included.

In operation 1, IABs directly exchange context information of their respective child nodes via an Xn interface. The context information includes an identifier of the child node and bearer establishment information.

In operation 2, the IAB determines which IABs have the context information of the child IAB of this IAB, and transmits an IAB list indicating the IABs to the child IAB. The IAB list includes the identifier information of the IABs.

In operation 3, after a link connection failure occurs in the child IAB, the IAB in the IAB list is preferentially selected for re-establishment.

Implementation 1-5

For a non CU/DU split scenario, the following operations are included.

In operation 1, IABs directly exchange their respective context information via an Xn interface.

In operation 2, the IAB determines which IABs have the context information of the IAB, and when a link connection failure occurs, the IAB preferentially selects an IAB node having its own context information to execute re-establishment.

Implementation 1-6

In operation 1, IABs directly exchange context information of their respective child nodes via an Xn interface. The context information includes the identifier of a child node of the IAB and bearer establishment information.

In operation 2, the IAB transmits an RRC connection release or RRC connection rejection message to the child node or terminal of the IAB. The RRC connection release or RRC connection rejection message includes an IAB list. The IAB list includes identifier information of IABs, identifier information of the donor IAB connected with the IABs, and PLMN information.

In operation 3, after a link connection failure occurs in the child node or the terminal, the IAB in the IAB list is preferentially selected for re-establishment.

Implementation 2

If the communication is interrupted due to a sudden blockage, the parent IAB has not yet initiated a handover procedure, and thus a normal handover procedure cannot be executed. According to the results of the IAB measurements, a topology management entity (e.g., donor IAB or parent IAB) periodically selects one or more candidate target parent IABs for each IAB node or UE, and notifies the IAB node of the selection result. If the topology management entity is the parent IAB, a handover preparation request is transmitted to the candidate target parent IAB. The candidate target parent IAB needs to allocate C-RNTI, a key id to be used in a security algorithm, and dedicated RACH resources for the IAB in advance, and notify the IAB of the allocation information together with information such as RACH related SS block information, UE-specific CSI-RS and SIB. Once the source parent IAB detects a blockage in the IAB or the UE, the source parent IAB initiates a handover activation indication to the candidate target parent IAB, transmits SN state information and executes data forwarding. The IAB initiates a random access request to the candidate target parent IAB on the allocated RACH resources, reports a new C-RNTI, completes a handover operation and establishes an RRC connection.

Alternatively, after detecting a link connection failure, the UE/IAB transmits a random access request to a candidate target parent IAB. After receiving the random access request from the UE/IAB, the candidate target parent IAB determines that a handover procedure is activated, and transmits a handover activation request to a source IAB. After receiving the handover activation request, the source IAB transmits confirmation information, or directly transmits SN state information and executes data forwarding.

Further, in order to reduce the time delay caused by the handover, the candidate target parent IAB also needs to allocate resources for the IAB in advance and notify the IAB of the allocated resources. Before the handover is activated, these allocated resources may be dynamically scheduled to be used by other terminals. After receiving a handover activation confirmation from the source parent IAB, the resources will no longer be allocated for other terminals, and will be reserved for the IAB.

Further, after the handover is completed, the source parent IAB may also notify other candidate target parent IABs to release the context information of the IAB and the related resources reserved for the handover.

Specific operations will be described in the following implementations 2-1, 2-2 and 2-3.

Implementation 2-1

Figure 9:
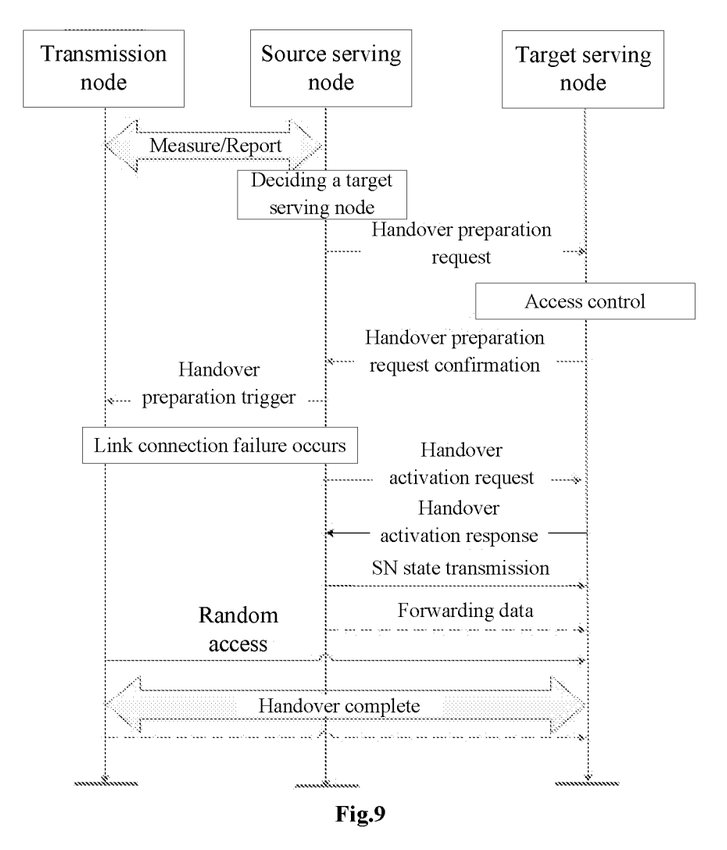
FIG. 9 is a first schematic flowchart of an implementation of the present disclosure.

After a terminal or an IAB selects a serving node that the terminal or the IAB needs to access, the terminal or the IAB executes measurement and reports a measurement result to a source serving node. The source serving node selects one or more candidate target serving nodes for the terminal or the IAB according to the measurement result. After that, a handover preparation operation is executed. FIG. 9 is a first schematic flowchart of an implementation of the present disclosure. As shown in FIG. 9, the flow includes the following operations.

In operation 1, a source serving node transmits handover preparation request information to a target serving node, wherein the handover preparation request information includes at least one of the followings: cause information, validity period information, cycle information, and identifier information of a target transmission node. The handover preparation request information may be a dedicated message, for example, a handover preparation request message or a re-establishment preparation request message. Alternatively, the handover preparation request information may be carried by a handover request message.

The cause information is used for indicating that the handover preparation request information is a request for advance preparation for handover or a re-establishment preparation request.

The validity period information is used for indicating a validity period of the handover preparation request information, and when the handover operation is still not executed after expiration of the validity period, the handover preparation request information becomes invalid.

The cycle information is used for indicating a cycle of transmitting the handover preparation request information, and when the handover operation is still not executed after expiration of the cycle, the handover preparation request information becomes invalid. (It should be noted that the validity period and the cycle are used in the same manner herein, but the cycle is used for indicating that the handover preparation request information is transmitted periodically.)

Further, the source transmission node may transmit handover request information to a plurality of target transmission nodes, wherein the handover request information is used to request reservation of handover resources. The identifier information of the target transmission node is used for indicating the identifier information of the target transmission node, and the identifier information may be identifiers for one or more target transmission nodes.

In operation 2, after receiving the handover preparation request information, the target serving node transmits handover preparation request confirmation information to the source serving node.

The confirmation information includes a C-RNTI, a key to be used in a security algorithm and dedicated RACH resources allocated for a terminal, and may further include information such as RACH-related SS block information, a UE specific CSI-RS and a system message. Corresponding to the operation 1, the handover preparation request confirmation information may be a dedicated message, for example, a handover preparation request confirmation message or a re-establishment preparation request confirmation message. Alternatively, the handover preparation request information may be carried in a handover request confirmation message.

In operation 3, after receiving the handover preparation request confirmation information, the source serving node transmits mobility control information for indicating handover to the terminal or the IAB node. The mobility control information includes a C-RNTI, a key to be used in a security algorithm, and dedicated RACH resources allocated for a terminal or an IAB, and may further include information such as RACH-related SS block information, a UE specific CSI-RS, and a system message. Further, the mobility control information may include handover activation condition information, for example, the handover is executed when a radio link failure occurs. Further, the mobility control information includes time information for indicating a cycle of transmitting the information or indicating a validity period of the information.

When a source serving node detects that a link interruption occurs in a terminal, a handover procedure is activated. The handover procedure includes the following operations.

In operation 4, the source serving node transmits handover activation request information to a target serving node, wherein the handover activation information includes terminal identifier information and cause information. The cause information indicates handover activation.

In operation 5, In one or more implementations of the embodiment, the target serving node may reject the handover activation request based on a current load condition, and therefore, if the activation of the handover is agreed, the target serving node transmits handover activation confirmation information to the source serving node.

In operation 6, after receiving the handover activation confirmation information from the target serving node, the source serving node starts to execute SN state transmission, and if there is data which fails to be successfully reported, the source serving node forwards user data to the target serving node.

On the other hand, after detecting that a radio link failure occurs on a terminal, the terminal may activate a handover procedure, and transmit a random access request to a target serving node according to received mobility control information.

In operation 7, after receiving the access request of the UE, the target serving node executes a subsequent access operation, and completes a handover flow:

The terminal includes a terminal node or a terminal function part of the IAB node.

Further, if the source serving node selects a plurality of candidate target serving nodes for the terminal, after the terminal changes the serving node, the source serving node notifies other candidate target serving nodes to release the context information of the terminal.

Implementation 2-2

After a terminal or an IAB selects a serving node which the IAB needs to access, the terminal or the IAB executes measurement and reports a measurement result to a source serving node. The source serving node selects one or more candidate target serving nodes for the terminal or the IAB according to the measurement result.

After the source serving node transmits the handover preparation request information to the candidate target serving nodes, and before the handover activation information is transmitted, if the source serving node re-selects a new candidate target handover serving node based on the measurement result reported by the terminal, the source serving node may transmit the handover cancellation indication information to the previous target handover serving node, wherein the handover cancellation indication information includes a cause value for the handover cancellation. After receiving the handover cancellation indication information, the target transmission node releases the context information of the terminal corresponding to the handover cancellation indication information, and further releases reserved resources if there are reserved resources. The process specifically includes the following operations.

In operation 1, a source serving node transmits handover request information to a candidate target serving node, wherein the handover request information includes at least one of the followings: cause information, validity period information, cycle information and identifier information of a target transmission node.

The cause information is used for indicating that the handover request information is a request for advance preparation for handover or a request for preparation for re-establishment.

The validity period information is used for indicating a validity period of the handover request, and when the handover operation is still not executed after expiration of the validity period, the handover request information becomes invalid.

The cycle information is used for indicating a cycle of transmitting the handover request message, and when the handover operation is still not executed after expiration of the cycle, the handover request message becomes invalid. (It should be noted that the validity period and the cycle are used in the same manner herein, but the cycle is used for indicating that the Substitute Specification, Clean Version handover request information is transmitted periodically.)

Further, the source transmission node may transmit handover request information to a plurality of candidate target transmission nodes, wherein the handover request information is used to request reservation of handover resources. The identifier information of the target transmission node is used for indicating the identifier information of the target transmission node, and the identifier information may be identifiers for one or more target transmission nodes.

In operation 2, after receiving the handover request information, the candidate target serving node transmits handover request confirmation information to the source serving node.

The confirmation information includes a C-RNTI, a key to be used in a security algorithm and dedicated RACH resources allocated for a terminal, and may further include information such as RACH-related SS block information, a UE specific CSI-RS, and a system message.

In operation 3, after receiving the handover request confirmation information, the source serving node transmits mobility control information for indicating handover to the terminal node. The mobility control information includes a C-RNTI, a key to be used in a security algorithm, and dedicated RACH resources allocated for the terminal, and may further include information such as RACH-related SS block information, a UE specific CSI-RS, and a system message. Further, the mobility control information includes handover activation condition information, for example, the handover is executed when a radio link failure occurs. Further, the mobility control information includes time information for indicating a cycle of transmitting the information or indicating a validity period of the information.

In operation 4, the source serving node re-selects a new candidate target handover serving node based on the measurement result reported by the terminal, and then may transmit handover cancellation indication information to the previous candidate target serving node, wherein the indication information includes a cause value for handover cancellation.

In operation 5, after receiving the handover cancellation indication information, the candidate target transmission node releases context information of the terminal corresponding to the handover cancellation indication information, and releases reserved resources if there are reserved resources.

Implementation 2-3

Figure 10:
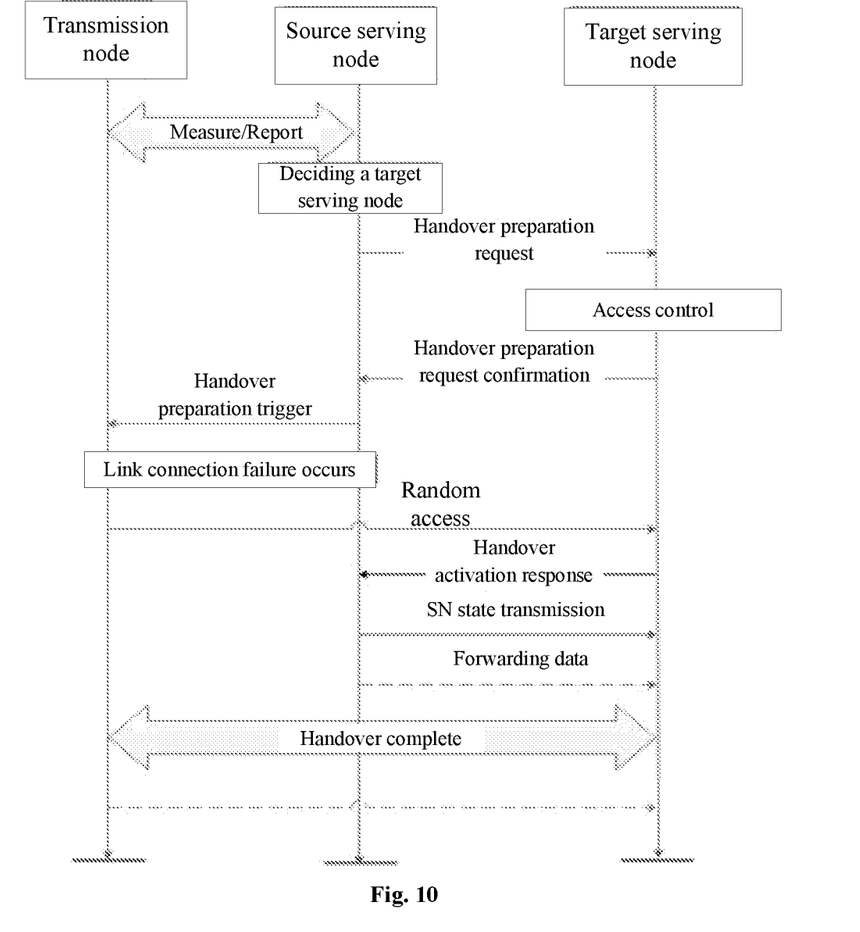
FIG. 10 is a second flowchart of an implementation of the present disclosure.

In the present implementation, after a terminal or an IAB selects a serving node which the terminal or the IAB needs to access, the terminal or the IAB executes measurement and reports a measurement result to a source serving node. The source serving node selects one or more candidate target serving nodes for the terminal or the IAB according to the measurement result. FIG. 10 is a second schematic flowchart of an implementation of the present disclosure, as shown in FIG. 10, the flow includes the following operations.

In operation 1, a source serving node transmits handover preparation request information to a target serving node, wherein the handover preparation request information includes at least one of the followings: cause information, validity period information, cycle information, and identifier information of a target transmission node. The handover preparation information may be a dedicated message, for example, a handover preparation request message or a re-establishment preparation request message. Alternatively, the handover preparation request information may be carried by a handover request message.

The cause information is used for indicating that the handover preparation request is a request for advance preparation for handover or a request for preparation for re-establishment.

The validity period information is used for indicating a validity period of the handover preparation request information, and when the handover operation is still not executed after expiration of the validity period, the handover preparation request information becomes invalid.

The cycle information is used for indicating a cycle of transmitting the handover preparation request information, and when the handover operation is still not executed after expiration of the cycle, the handover preparation request information becomes invalid. (It should be noted that the validity period and the cycle are used in the same manner herein, but the cycle is used for indicating that the handover request information is transmitted periodically.)

Further, the source transmission node may transmit handover request information to a plurality of target transmission nodes, wherein the handover request information is used to request reservation of handover resources. The identifier information of the target transmission node is used for indicating the identifier information of the target transmission node, and the identifier information may be identifiers for one or more target transmission nodes.

In operation 2, after receiving the handover preparation request information, the target serving node transmits handover preparation request confirmation information to the source serving node.

The confirmation information includes a C-RNTI, a key to be used in a security algorithm, and dedicated RACH resources allocated for a terminal, and may further include information such as RACH-related SS block information, a UE specific CSI-RS, and a system message. Corresponding to operation 1, the handover preparation request confirmation information may be a dedicated message, for example, a handover preparation request confirmation message or a re-establishment preparation request confirmation message. Alternatively, the handover preparation request information may be carried in a handover request confirmation message.

In operation 3, after receiving the handover preparation request confirmation information, the source serving node transmits mobility control information for indicating handover to the terminal or the IAB node. The mobility control information includes a C-RNTI, a key to be used in a security algorithm, and dedicated RACH resources allocated for a terminal or an IAB, and may further include information such as RACH-related SS block information, a UE specific CSI-RS, and a system message. Further, the mobility control information includes handover activation condition information, for example, the handover is executed when a radio link failure occurs. Further, the mobility control information includes time information for indicating a cycle of transmitting the information or indicating a validity period of the information.

After a terminal or an IAB detects that a radio link failure occurs on the terminal or the IAB, a handover procedure may be activated. The handover procedure may include the following operations.

In operation 4, the terminal or the IAB transmits a random access request to the target serving node according to the received mobility control information.

In operation 5, after receiving the random access information initiated by the terminal, the target serving node transmits handover activation indication information to the source serving node of the terminal.

In operation 6, after receiving the handover activation indication information transmitted by the target serving node, the source serving node transmits handover activation confirmation information. Alternatively, after receiving the handover activation indication information transmitted by the target transmission node, the source transmission node directly transmits the SN (sequence number) state information to the target transmission node. If there is data not successfully reported, user data is forwarded to the target serving node.

In operation 7, the target serving node executes a subsequent access operation, and completes a handover procedure.

Implementation 3

Implementation 3-1

The present implementation is similar to the implementation 2, but differs in that the Substitute Specification, Clean Version present implementation is applied to a CU/DU split scenario, and a CU (centralized management unit) selects the specific scenario for each DU (distributed unit).

Figure 11:
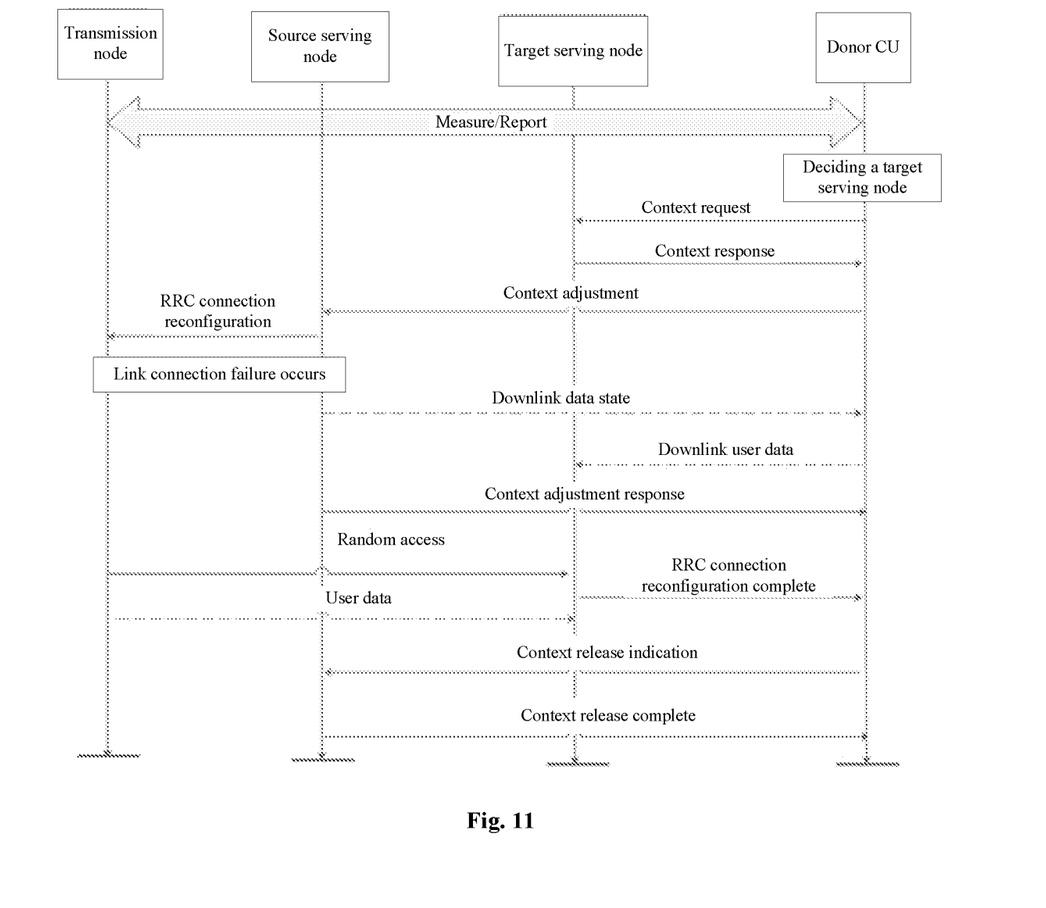
FIG. 11 is a third flowchart of an implementation of the present disclosure.

After a terminal or an IAB selects to access a serving node, the terminal or the IAB executes measurement and reports a measurement result to the serving node. The serving node transmits the measurement result to a donor CU. The donor CU selects a candidate target serving node for the terminal or the IAB according to the measurement result. Then, the execution of the handover preparation operation is started. FIG. 11 is a third schematic flowchart of an implementation of the present disclosure, as shown in FIG. 11, the flow includes the following operations.

In operation 1, a donor CU transmits, to a target DU, context establishment request information of a terminal or an IAB, wherein the context establishment request information includes at least one of the followings: cause information, validity period information, cycle information and identifier information of the target DU.

The cause information is used for indicating that the context establishment request is a request for advance preparation for handover or a request for preparation for re-establishment.

The validity period information is used for indicating a validity period of the context establishment request, and when the handover or re-establishment operation is still not executed after expiration of the validity period, the context establishment request information becomes invalid.

The cycle information is used for indicating a cycle of transmitting the context establishment request message, and when the handover or re-establishment operation is still not executed after expiration of the cycle, the context establishment request message becomes invalid.

Further, the CU may transmit context establishment request information to a plurality of target DUs, wherein the context establishment request information is used for requesting preparation of handover resources or preparation of re-establishment information.

In operation 2, after receiving the context establishment request information, the target DU transmits context establishment request confirmation information to the donor CU.

The confirmation information includes a C-RNTI, a key to be used in a security algorithm, and dedicated RACH resources allocated for a terminal or an IAB, and may further include information such as RACH-related SS block information, a UE-specific or IAB-specific CSI-RS, and a system message.

In operation 3, after receiving the context establishment request confirmation information, the donor CU transmits context adjustment request information to the source DU of the terminal or the IAB.

In operation 4, the source DU transmits RRC reconfiguration information to the terminal or the IAB. The RRC reconfiguration information includes a C-RNTI, a key to be used in a security algorithm, and dedicated RACH resources allocated for a terminal or an IAB, and may further include information such as RACH-related SS block information, a UE specific CSI-RS, and a system message. Further, the RRC reconfiguration information may further include handover activation condition information, for example, the handover is executed when a radio link failure occurs. Further, the RRC reconfiguration information may further include time information for indicating a cycle of transmitting the information or indicating a validity period of the information.

When a source DU detects link interruption on a terminal or an IAB, a handover procedure is activated. The handover procedure includes the following operations.

In operation 5, the source DU transmits context adjustment response information to the donor CU, wherein the context adjustment response information includes identifier information of the terminal or the IAB, and cause information. The cause information indicates handover activation.

In operation 6, in parallel with operation 5, after the terminal or the IAB detects that a radio link failure occurs therein, the terminal or the IAB may activate a handover procedure, and transmits a random access request to a target serving node according to received RRC reconfiguration information.

In operation 7, after receiving the access request of the UE, the target DU transmits an RRC reconfiguration completion message to the donor CU.

In operations 8-9, the donor CU requests the source DU to release context information of the terminal or the IAB.

The terminal includes a terminal node, or a terminal function part of the terminal node.

Implementation 3-2

Based on the above implementation 3-1, if the CU selects a plurality of candidate serving IAB nodes for the terminal or the IAB, after the terminal or the IAB replaces the serving node, or after the CU re-selects a new serving IAB node for the terminal or the IAB, the CU notifies the original serving IAB node and the candidate serving IAB node to release the context information of the terminal or the IAB.

Implementation 3-3

The present implementation differs from implementation 3-1 in that the execution order of the operations is changed. Specifically, the operation 1, operation 2 and operation 3 are executed in sequence. When the radio link failure is detected, the operation 6 is executed. After receiving a random access request from a terminal or an IAB, a target serving DU notifies a CU of the handover activation. The CU transmits handover activation information to the source serving DU. After the source serving DU receives the handover activation information, the source serving DU transmits downlink data state information to the CU. The CU then forwards the downlink data state information to the target serving DU. The target serving DU executes the operation 7, and the CU executes the operations 8 and 9. As such, the handover is completed.

Implementation 4

For a multi-connection scenario, the following handover optimization scheme is considered.

Figure 12:
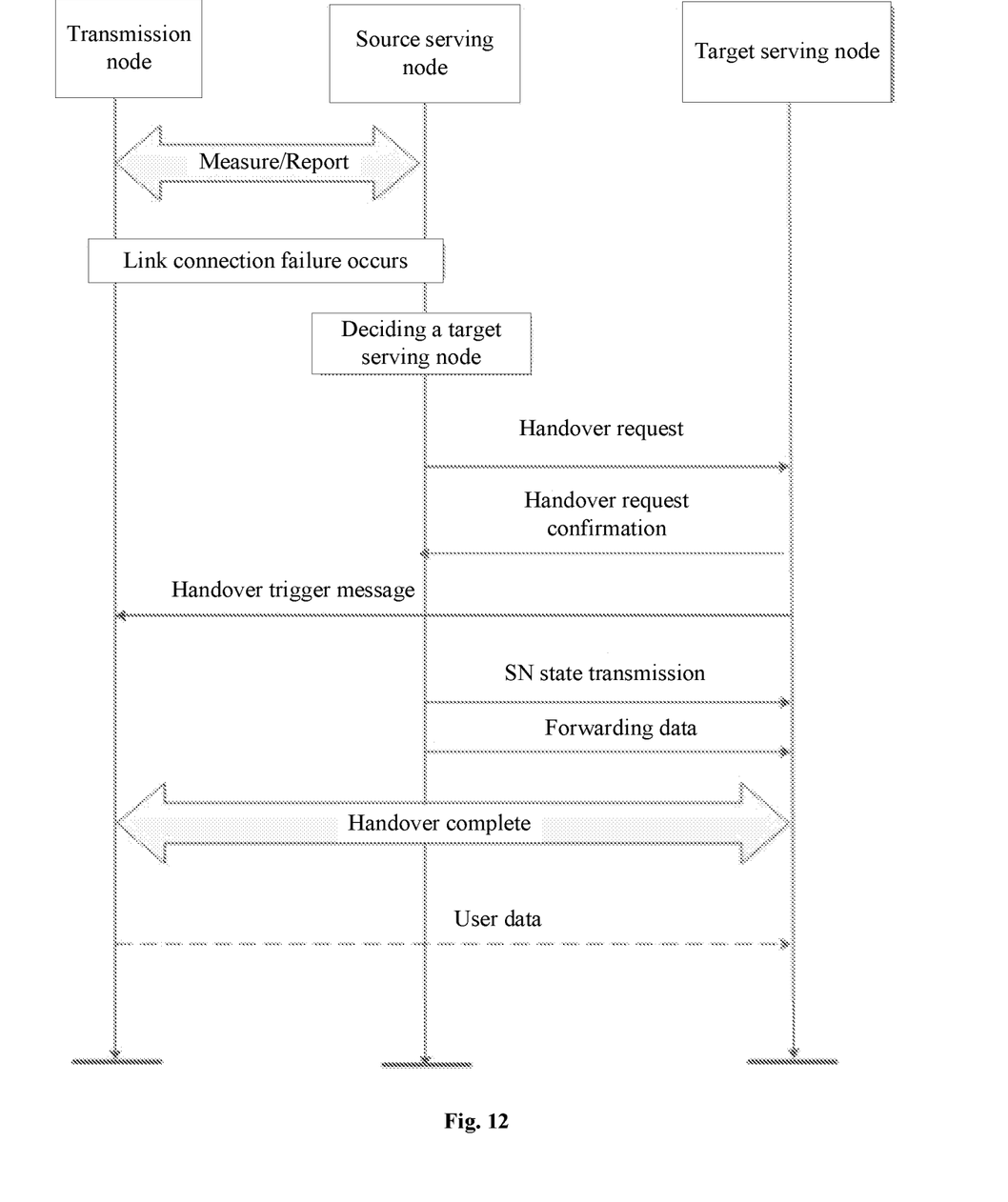
FIG. 12 is a fourth flowchart of an implementation of the present disclosure.

In the existing mechanism, if a main serving node (MN) cannot communicate with a terminal due to a sudden Radio Link Failure (RLF) of the MN, and the normal handover procedure cannot be executed. Therefore, even if the multi-connection is adopted, the affection from the RLF cannot be avoided. However, compared with a single connection manner, when an RLF occurs in an MN, a communication link of a secondary serving node (SN) may be normal. Therefore, as an enhancement manner for shortening a time delay, if it is determined to make the SN become an MN, after a handover decision has been made, the SN may transmit an RRC connection reconfiguration message to notify a UE of the handover decision. FIG. 12 is a fourth flowchart of an implementation of the present disclosure.

EMBODIMENT 4

The embodiments of the present disclosure provide a storage medium. The storage medium stores a computer program. The computer program is configured to execute the operations in any one of the method embodiments at runtime.

In one or more exemplary implementations of the embodiment, the storage medium may be configured to store a computer program for executing the following operations:

S1, context information of a first transmission node or a second transmission node transmitted by the first transmission node is received; and S2, the context information is stored.

In one or more implementations of the embodiment, the storage medium may include, but is not limited to, any medium that can store a computer program, such as a USB flash drive, a read-only memory (Read-Only Memory, ROM for short), a random access memory (Random Access Memory, RAM for short), a removable hard disk, a magnetic disk, or an optical disc.

The embodiments of the present disclosure also provide an electronic device, including a memory and a processor. The memory stores a computer program. The processor is configured to run the computer program to execute operations in any one of the method embodiments.

In one or more implementations of the embodiment, the electronic device may further include a transmission device and an input/output device, wherein the transmission device is connected to the processor, and the input/output device is connected to the processor.

In one or more implementations of the embodiment, the processor may be configured to execute the following operations by means of a computer program:

S1, context information of a first transmission node or a second transmission node transmitted by the first transmission node is received; and S2, the context information is stored.

Optionally, specific implementations for the present embodiment may refer to the examples described in the above embodiments and alternative implementations, and details are not repeated in the present embodiment.

It is apparent that those having ordinary skill in the art shall understand that all of the above-mentioned modules or operations in the present disclosure may be implemented by using a general computation apparatus, may be centralized on a single computation apparatus or may be distributed on a network composed of multiple computation apparatuses. Optionally, they may be implemented by using executable program codes of the computation apparatuses. Thus, they may be stored in a storage apparatus and executed by the computation apparatuses, the shown or described operations may be executed in a sequence different from this sequence under certain conditions, or they are manufactured into each integrated circuit module respectively, or multiple modules or operations therein are manufactured into a single integrated circuit module. Thus, the embodiments of the present disclosure are not limited to any specific hardware and software combination.

The above is only the exemplary embodiments of the present disclosure, not intended to limit the present disclosure. As will occur to those having ordinary skill in the art, the present disclosure is susceptible to various modifications and changes. Any modifications, equivalent replacements, improvements and the like made within the principle of the present disclosure shall fall within the scope of protection of the present disclosure.

INDUSTRIAL APPLICABILITY

The solution provided in the embodiments of the present disclosure is applicable to the Substitute Specification, Clean Version field of communications. By receiving and storing context information of a first transmission node or a second transmission node, when a link of the transmission node is interrupted, the context information can be used to recover the link, thereby avoiding a re-establishment flow, solving the technical problem in the related art that the recovery delay of the link interruption is too long, and satisfying the requirements of services on the interruption delay.

What is claimed is:

1. An information transmission method, comprising:
receiving, by a target serving node of a transmission node, handover preparation request information transmitted by a source serving node of the transmission node, wherein the handover preparation request information comprises at least one of the followings: cause information, validity period information, cycle information and identifier information of a target transmission node; and transmitting, by the target serving node, handover preparation confirmation information to the source serving node after receiving the handover preparation request information;

wherein the cause information is used for indicating that the handover preparation request information is a request for advance preparation for handover or a request for preparation for re-establishment: the validity period information is used for indicating a validity period of the handover preparation request information: the cycle information is used for indicating a cycle of transmitting the handover preparation request information, and when a handover or re-establishment operation is still not executed after expiration of the cycle, the handover preparation request information becomes invalid;

the method further comprising:
transmitting, by the target serving node, handover activation indication information to the source serving node after receiving the handover preparation request information and after receiving random access information intiated by a terminal.

2. The method as claimed in claim 1, wherein the source serving node transmits the handover preparation request information to a plurality of target serving nodes, wherein the handover preparation request information is used for requesting preparation of handover resources, and identifier information of a plurality of target transmission nodes corresponds to the plurality of target serving nodes.

3. The method as claimed in claim 1, wherein the source serving node is at least one of the followings: a Centralized Unit (CU), a Distributed Unit (DU), an Integrated Access Backhaul (IAB) node, a relay, and a base station; the target serving node is at least one of the followings: a DU, an IAB node, a relay and a base station.

4. The method as claimed in claim 3, wherein when the transmission node is an IAB node, the source serving node is a parent node of the IAB node.

5. The method as claimed in claim 1, wherein after transmitting the handover activation indication information to the source serving node, the method further comprises:
receiving handover activation confirmation information transmitted by the source serving node; or, receiving Serial Number (SN) state information transmitted by the source serving node.

6. The method as claimed in claim 1, wherein after detecting that a link connection failure occurs in the serving node, the source serving node transmits handover activation indication information to the target serving node.

7. The method as claimed in claim 1, wherein after transmitting the handover preparation request information to the target serving node, the source serving node transmits handover cancellation indication information to the target serving node, wherein the handover cancellation indication information comprises a cause value for handover cancellation, after receiving the handover cancellation indication information, the target serving node releases context information and/or reserved resources of the transmission node corresponding to the handover cancellation indication information.

8. The method as claimed in claim 1, wherein after transmitting the handover preparation request information to the target serving node, the source serving node transmits mobility control information to the transmission node, wherein the mobility control information comprises handover activation condition information, the handover activation condition information comprises time information for indicating a cycle of transmitting the mobility control information or indicating a validity period of the mobility control information, or, information for executing handover when a radio link failure occurs.

9. An information transmission device, comprising a memory and a processor, wherein the memory stores a computer program, and the processor is configured to run the computer program to execute the operations of the method as claimed in claim 1.

10. A non-transitory storage medium, wherein the storage medium stores a computer program, wherein the computer program is configured to execute the method as claimed in claim 1 at runtime.

11. An information transmission method, comprising:
receiving, by a transmission node, a Radio Resource Control (RRC) connection release message or an RRC connection rejection message transmitted by a source serving node of the transmission node, wherein the RRC connection release message or the RRC connection rejection message comprises an Integrated Access Backhaul (IAB) list, and the IAB list comprises: identifier information of one or more IAB nodes, identifier information of one or more donor IABs connected to the one or more IAB nodes, and Public Land Mobile Network (PLMN) information; and
when a link connection failure occurs in the transmission node, preferentially selecting an IAB node in the IAB list for re-establishment.

12. An information transmission device, comprising a memory and a processor, wherein the memory stores a computer program, and the processor is configured to run the computer program to execute the operations of the method as claimed in claim 11.

13. A non-transitory storage medium, wherein the storage medium stores a computer program, wherein the computer program is configured to execute the method as claimed in claim 11 at runtime.

* * * * *